(12) United States Patent
Mukherjee et al.

(10) Patent No.: US 11,252,709 B2
(45) Date of Patent: Feb. 15, 2022

(54) CHANNEL PARTITIONING FOR FREQUENCY-HOPPING NARROWBAND IOT

(71) Applicant: TELEFONAKTIEBOLAGET L M ERICSSON (PUBL), Stockholm (SE)

(72) Inventors: Amitav Mukherjee, Fremont, CA (US); Xingqin Lin, Santa Clara, CA (US); Yi-Pin Eric Wang, Fremont, CA (US); Cagatay Capar, Adana (TR); Jung-Fu Cheng, Fremont, CA (US); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/330,046

(22) PCT Filed: Aug. 31, 2017

(86) PCT No.: PCT/IB2017/055250
§ 371 (c)(1),
(2) Date: Mar. 1, 2019

(87) PCT Pub. No.: WO2018/042371
PCT Pub. Date: Mar. 8, 2018

(65) Prior Publication Data
US 2019/0215811 A1 Jul. 11, 2019

Related U.S. Application Data

(60) Provisional application No. 62/382,751, filed on Sep. 1, 2016.

(51) Int. Cl.
*H04W 72/04* (2009.01)
*H04B 1/713* (2011.01)
(Continued)

(52) U.S. Cl.
CPC .......... *H04W 72/042* (2013.01); *H04B 1/713* (2013.01); *H04W 16/14* (2013.01);
(Continued)

(58) Field of Classification Search
CPC ............... H04W 72/042; H04W 16/14; H04W 72/0453; H04W 84/02; H04W 84/18; H04W 72/04; H04B 1/713
See application file for complete search history.

(56) References Cited

U.S. PATENT DOCUMENTS

2008/0291049 A1  11/2008  Meek
2012/0307744 A1  12/2012  Charbit et al.
(Continued)

FOREIGN PATENT DOCUMENTS

WO  2004112325 A1  12/2004

OTHER PUBLICATIONS

Loy et al., "ISM-Band and Short Range Device Regulatory Compliance Overview", Application Report, Texas Instruments, Jan. 1, 2005.
(Continued)

*Primary Examiner* — Sam K Ahn
*Assistant Examiner* — Amneet Singh
(74) *Attorney, Agent, or Firm* — Withrow & Terranova, PLLC

(57) ABSTRACT

According to some embodiments, a method for use in a frequency-hopping wireless transmitter for transmitting in unlicensed spectrum comprises: obtaining a configuration for a plurality of frequency channels in unlicensed spectrum; and transmitting a data transmission according to a frequency-hopping pattern across the plurality of frequency channels. The configuration for the plurality of frequency channels comprises a first subset of frequency channels for downlink transmission and a second subset of frequency
(Continued)

700

712 - obtain a configuration for a plurality of frequency channels in unlicensed spectrum

↓

714 - transmit a data transmission according to a frequency-hopping pattern across the plurality of frequency channels channels for uplink transmission. The frequency channels in the first and second subsets are mutually exclusive. In some embodiments the first and second subset of frequency channels each comprise 160 frequency channels in the 2.4 GHz band, or 50 frequency channels in the 915 MHz band.

19 Claims, 10 Drawing Sheets

(51) Int. Cl.
 *H04W 16/14* (2009.01)
 *H04W 84/18* (2009.01)
 *H04W 84/02* (2009.01)
(52) U.S. Cl.
 CPC ....... *H04W 72/04* (2013.01); *H04W 72/0453* (2013.01); *H04W 84/02* (2013.01); *H04W 84/18* (2013.01)

(56) References Cited

U.S. PATENT DOCUMENTS

| | | | | |
|---|---|---|---|---|
| 2015/0071239 A1* | 3/2015 | Zhang | ................. | H04L 1/04 370/329 |
| 2015/0319784 A1* | 11/2015 | Bhushan | ............... | H04W 74/08 370/329 |
| 2017/0332440 A1* | 11/2017 | Xu | ..................... | H04W 28/021 |
| 2018/0020452 A1* | 1/2018 | Yerramalli | .......... | H04W 52/143 |

OTHER PUBLICATIONS

"3rd Generation Partnership Project; Technical Specification Group Radio Access Network; Evolved Universal Terrestrial Radio Access (E-UTRA); NB-IOT; Technical Report for BS and UE radio transmission and reception (Release 13)", 3GPP TR36.802 v13.0.0, Jul. 2, 2016.

Intel Corporation, "Remaining details of NB-IoT multi-carrier operation", 3GPP TSG RAN WG1 NB-IoT Ad-Hoc Meeting, R1-161893, Mar. 16, 2016.

International Search Report and Written Opinion for International Patent Application No. PCT/IB2017/055250, dated Nov. 23, 2017, 10 pages.

Teng, Fei, et al., "Sharing of Unlicensed Spectrum by Strategic Operators," Global Conference on Signal and Information Processing, Dec. 2014, IEEE, pp. 288-292.

Examination Report for European Patent Application No. 17772107.3, dated Jul. 3, 2020, 9 pages.

* cited by examiner

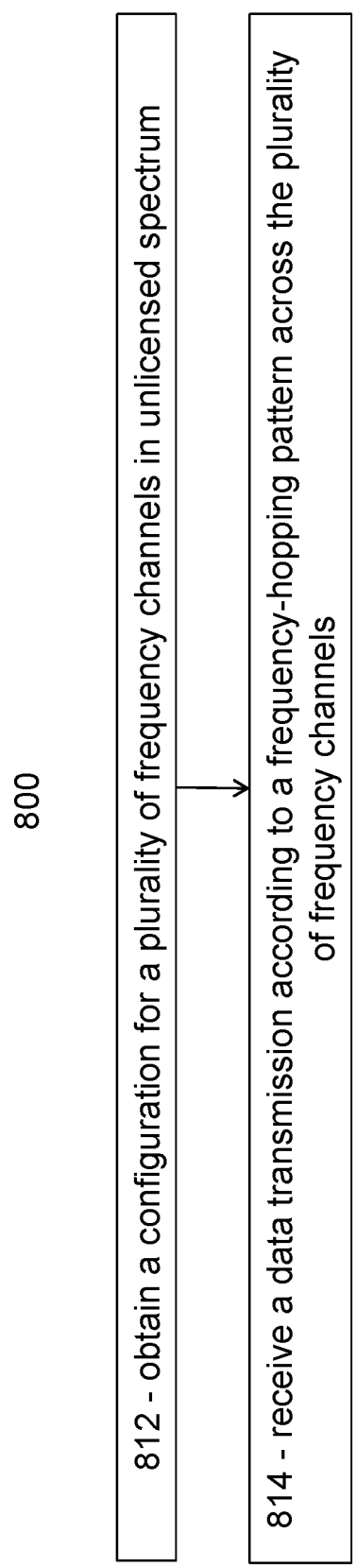

CHANNEL PARTITIONING FOR FREQUENCY-HOPPING NARROWBAND IOT

RELATED APPLICATIONS

This application is a national stage application of International Patent Application No. PCT/IB2017/055250, filed Aug. 31, 2017, which claims the benefit of U.S. provisional patent application Ser. No. 62/382,751, filed Sep. 1, 2016, the disclosures of which are hereby incorporated herein by reference in their entirety.

TECHNICAL FIELD

Particular embodiments are directed to wireless communications and, more particularly, to methods and apparatus for channel partitioning for frequency-hopping in a narrowband (NB) internet of things (IoT) system.

INTRODUCTION

The Internet of Things (IoT) is the inter-networking of physical devices, vehicles, buildings, and other items embedded with electronics, software, sensors, actuators, and network connectivity which enable the objects to collect and exchange data. Cellular technologies are being developed or evolved to play a role in IoT, particularly machine type communication (MTC).

MTC is characterized by lower demands on data rates than, for example, mobile broadband, but with higher requirements on, for example, low cost device design, better coverage, and an ability to operate for years on batteries without charging or replacement. To meet various IoT design objectives, the Third Generation Partnership Project (3GPP) has standardized Narrowband IoT (NB-IoT) in Release 13 with a system bandwidth of 180 kHz and targeting improved coverage, long battery life, low complexity communication design, and network capacity that is sufficient for supporting a massive number of devices.

To further increase the market impact of NB-IoT, 3GPP may extend its deployment mode to unlicensed band operation, particularly by the MulteFire Alliance. For example, in the United States, the 915 MHz and 2.4 GHz Industrial, Scientific and Medical (ISM) frequency bands may be used. An unlicensed band, however, may have specific regulations that ensure different systems can co-exist in the band with good performance and fairness. Particular modifications to Rel-13 NB-IoT may be needed to comply with the regulations.

In the aforementioned US ISM band, it is advantageous to adopt frequency hopping (FH) so that a transmitter can transmit at a higher power level without power spectral density (PSD) limitation or requiring listen-before-talk (LBT). When frequency hopping is used, the set of channels for downlink and uplink communications may be designed to adhere to regulations while avoiding persistent interference among coexisting networks.

Certain regulatory requirements for operation in the United States 2.4 GHz and 915 MHz unlicensed bands are summarized in Table 1 and Table 2, respectively.

TABLE 1

US 2.4 GHz regulations

| Modulation | # of hopping channels (N) | Dwell time | EIRP |
| --- | --- | --- | --- |
| Frequency Hopping | ≥75 | 0.4 s per 0.4 × N seconds | 36 dBm |
| Frequency Hopping | 15 ≤ N < 75 | 0.4 s per 0.4 × N seconds | 27 dBm |
| Digitally Spread | No restriction | No restriction | 36 dBm |
| Other | No restriction | No restriction | −0.23 dBm (avg); |

TABLE 2

US 915 MHz regulations

| Modulation | BW | # of hopping channels | Dwell time | EIRP |
| --- | --- | --- | --- | --- |
| Frequency Hopping | <250 kHz (20 dB BW) | ≥50 | 0.4 s per 20 seconds | 36 dBm |
| Frequency Hopping | >250 kHz (20 dB BW) | ≥25 | 0.4 s per 10 seconds | 30 dBm |
| Digitally Spread | ≥500 kHz (6 dB BW) | No restriction | No restriction | 36 dBm |
| Other | No restriction | No restriction | No restriction | −1.23 dBm |

SUMMARY

According to some embodiments, a method for use in a frequency-hopping wireless transmitter for transmitting in unlicensed spectrum comprises: obtaining a configuration for a plurality of frequency channels in unlicensed spectrum; and transmitting a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

In particular embodiments, the first and second subset of frequency channels are allocated to a first network. In some embodiments, a first portion of the first subset of frequency channels and a first portion of the second subset of frequency channels are allocated to a first network, and a second portion of the first subset of frequency channels and a second portion of the second subset of frequency channels are allocated to a second network. A bandwidth of each frequency channel of the plurality of frequency channels may comprise 250 kHz.

In particular embodiments, the unlicensed spectrum may comprise a 2.4 GHz band, and the first and second subset of frequency channels each comprise 160 frequency channels. The first portion of the first and second subsets of frequency channels may comprise 80 frequency channels and the second portion of the first and second subsets of frequency channels may comprise 80 frequency channels. A transmit power of the data transmission may be as high as 36 dBm.

In particular embodiments, the unlicensed spectrum comprises a 915 MHz band, and the first and second subset of frequency channels each comprise 50 frequency channels. A transmit power of the data transmission may be as high as 36 dBm. The first portion of the first and second subsets of frequency channels may comprise 25 frequency channels and the second portion of the first and second subsets of frequency channels may comprise 25 frequency channels. A transmit power of the data transmission may be as high as 30 dBm.

In particular embodiments, the wireless transmitter comprises a user equipment or a network node.

According to some embodiments, a frequency-hopping wireless transmitter operable to transmit in unlicensed spectrum comprises processing circuitry operable to: obtain a configuration for a plurality of frequency channels in unlicensed spectrum; and transmit a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

In particular embodiments, the first and second subset of frequency channels are allocated to a first network. In some embodiments, a first portion of the first subset of frequency channels and a first portion of the second subset of frequency channels are allocated to a first network, and a second portion of the first subset of frequency channels and a second portion of the second subset of frequency channels are allocated to a second network. A bandwidth of each frequency channel of the plurality of frequency channels may comprise 250 kHz.

In particular embodiments, the unlicensed spectrum comprises a 2.4 GHz band, and the first and second subset of frequency channels each comprise 160 frequency channels. The first portion of the first and second subsets of frequency channels may comprise 80 frequency channels and the second portion of the first and second subsets of frequency channels may comprise 80 frequency channels. A transmit power of the data transmission may be as high as 36 dBm.

In particular embodiments, the unlicensed spectrum comprises a 915 MHz band, and the first and second subset of frequency channels each comprise 50 frequency channels. A transmit power of the data transmission may be as high as 36 dBm. The first portion of the first and second subsets of frequency channels may comprise 25 frequency channels and the second portion of the first and second subsets of frequency channels may comprise 25 frequency channels. A transmit power of the data transmission may be as high as 30 dBm.

In particular embodiments, the wireless transmitter comprises a user equipment or a network node.

According to some embodiments, a method for use in a frequency-hopping wireless receiver for receiving in unlicensed spectrum comprises: obtaining a configuration for a plurality of frequency channels in unlicensed spectrum; and receiving a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

In particular embodiments, the first and second subset of frequency channels are allocated to a first network. In some embodiments, a first portion of the first subset of frequency channels and a first portion of the second subset of frequency channels are allocated to a first network, and a second portion of the first subset of frequency channels and a second portion of the second subset of frequency channels are allocated to a second network. A bandwidth of each frequency channel of the plurality of frequency channels may comprise 250 kHz.

In particular embodiments, the unlicensed spectrum comprises a 2.4 GHz band, and the first and second subset of frequency channels each comprise 160 frequency channels. The first portion of the first and second subsets of frequency channels may comprise 80 frequency channels and the second portion of the first and second subsets of frequency channels may comprise 80 frequency channels. A transmit power of the data transmission may be as high as 36 dBm.

In particular embodiments, the unlicensed spectrum comprises a 915 MHz band, and the first and second subset of frequency channels each comprise 50 frequency channels. A transmit power of the data transmission may be as high as 36 dBm. The first portion of the first and second subsets of frequency channels may comprise 25 frequency channels and the second portion of the first and second subsets of frequency channels may comprise 25 frequency channels. A transmit power of the data transmission may be as high as 30 dBm.

In particular embodiments, the wireless receiver comprises a user equipment or a network node.

According to some embodiments, a frequency-hopping wireless receiver operable to receive in unlicensed spectrum comprises processing circuitry operable to: obtain a configuration for a plurality of frequency channels in unlicensed spectrum; and receive a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

In particular embodiments, the first and second subset of frequency channels are allocated to a first network. In some embodiments, a first portion of the first subset of frequency channels and a first portion of the second subset of frequency channels are allocated to a first network, and a second portion of the first subset of frequency channels and a second portion of the second subset of frequency channels are allocated to a second network. A bandwidth of each frequency channel of the plurality of frequency channels may comprise 250 kHz.

In particular embodiments, the unlicensed spectrum comprise a 2.4 GHz band, and the first and second subset of frequency channels each comprise 160 frequency channels. The first portion of the first and second subsets of frequency channels may comprise 80 frequency channels and the second portion of the first and second subsets of frequency channels may comprise 80 frequency channels. A transmit power of the data transmission may be as high as 36 dBm.

In particular embodiments, the unlicensed spectrum comprises a 915 MHz band, and the first and second subset of frequency channels each comprise 50 frequency channels. A transmit power of the data transmission may be as high as 36 dBm. The first portion of the first and second subsets of frequency channels may comprise 25 frequency channels and the second portion of the first and second subsets of frequency channels may comprise 25 frequency channels. A transmit power of the data transmission may be as high as 30 dBm.

In particular embodiments, the wireless receiver comprises a user equipment or a network node.

According to some embodiments, a frequency-hopping wireless transmitter operable to transmit in unlicensed spectrum comprises an obtaining module and a transmitting module. The obtaining module is operable to obtain a configuration for a plurality of frequency channels in unlicensed spectrum. The transmitting module is operable to transmit a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

According to some embodiments, a frequency-hopping wireless receiver operable to receive in unlicensed spectrum comprises an obtaining module and a receiving module. The obtaining module is operable to obtain a configuration for a plurality of frequency channels in unlicensed spectrum. The receiving module is operable to receive a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

Also disclosed is a computer program product. The computer program product comprises instructions stored on non-transient computer-readable media which, when executed by a processor, perform the steps of: obtaining a configuration for a plurality of frequency channels in unlicensed spectrum; and transmitting a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

Another computer program product comprises instructions stored on non-transient computer-readable media which, when executed by a processor, perform the steps of: obtaining a configuration for a plurality of frequency channels in unlicensed spectrum; and receiving a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

Particular embodiments may exhibit some of the following technical advantages. For example, the spectrum partitioning of particular embodiments may maximize the allowed transmit power as per regulatory restrictions, and allow flexibility in network deployment. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 8 is a flow diagram illustrating an example method in a wireless receiver, according to some embodiments;

DETAILED DESCRIPTION

Figure 1:
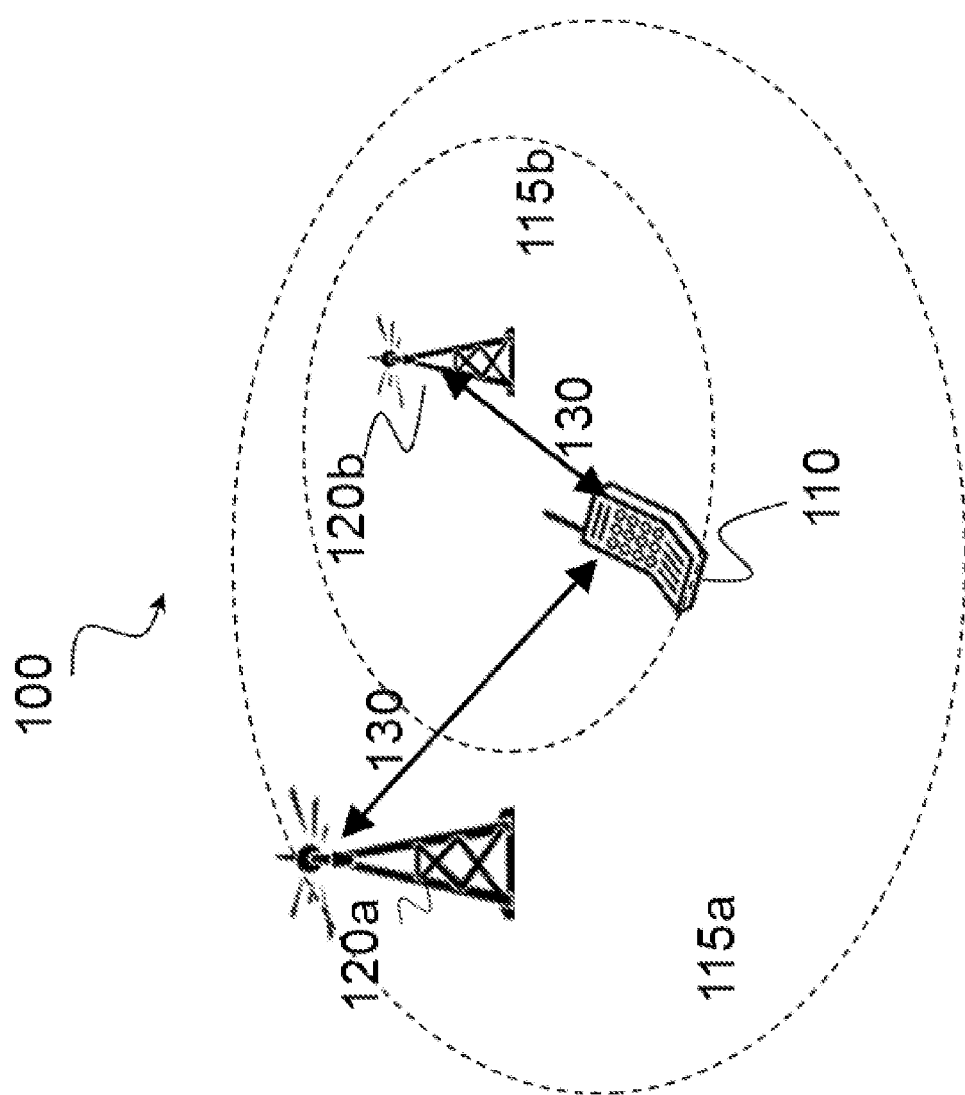
FIG. 1 is a block diagram illustrating an example wireless network, according to some embodiments.

Third Generation Partnership Project (3GPP) has standardized Narrowband Internet of Things (NB-IoT) technology for licensed spectrum operation. NB-IoT is also a strong candidate for adoption in unlicensed spectrum systems such as MulteFire. The 3GPP NB-IoT solution, however, is not suitable for operation in unlicensed spectrum, such as the US 900 MHz band and the 2.4 GHz ISM band, because of the different regulatory requirements in these unlicensed bands.

Particular embodiments obviate the problems described above and include partitioning the available spectrum in certain unlicensed bands (e.g., the 2.4 GHz and 915 MHz unlicensed bands in the United States) to construct a frequency-hopping NB-IoT network. For the United States 2.4 GHz band, the number of 250 kHz-wide frequency channels that is used for downlink or uplink transmissions is set to either 160 or 80 each. For the 915 MHz band, the number of 250 kHz-wide frequency channels that is used for downlink or uplink transmissions is set to either 50 or 25 each. Adjacent cells can be configured to use non-overlapping sets of 80 frequency channels for their operation.

These and other embodiments may provide various potential benefits compared to conventional techniques and technologies. For instance, the partitioning may maximize the allowed transmit power as per regulatory restrictions, and allow flexibility in network deployment.

Tables 1 and 2 show that frequency hopping is the best option for NB-IoT operation in these bands, assuming a 250 kHz spacing for each NB-IoT carrier (1 physical resource block (PRB) along with guard bands). With this channel bandwidth, the 83.5 MHz available in the 2.4 GHz band can, in principle, support up to 334 NB-IoT frequency channels or hopping channels. The 915 MHz band can support up to 104 NB-IoT frequency channels or hopping channels in principle. Particular embodiments partition the available frequency channels.

The specific bands and specific number of channels as described herein are nonlimiting example embodiments to teach coexisting groups of frequency hopping channels. The teachings are applicable to different specifics including different bands, different bandwidths and different number of channels.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-10B of the drawings, like numerals being used for like and corresponding parts of the various drawings. LTE is used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may include frames and subframes. Network node 120 may dynamically schedule subframes as an uplink subframe, a downlink subframe, or a combination uplink and downlink subframe.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In some embodiments, wireless device 110 and network node 120 may operate in unlicensed spectrum without performing a LBT procedure. In some embodiments, wireless device 110 and network node 120 may use frequency-hopping to avoid using LBT.

According to some embodiments, a wireless transmitter and a wireless receiver, such as wireless device 110 or network node 120, obtains a configuration for a plurality of frequency channels in unlicensed spectrum, and transmits or receives a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive. Examples of first and second subsets are described in more detail with respect to FIGS. 2-6.

As a particular example, a bandwidth of each frequency channel may comprise 250 kHz. In particular embodiments, the first and second subset of frequency channels are allocated to a first network, such as network 115a. In some embodiments, a first portion of the first subset of frequency channels and a first portion of the second subset of frequency channels are allocated to a first network, such as network 115a, and a second portion of the first subset of frequency channels and a second portion of the second subset of frequency channels are allocated to a second network, such as network 115b. This may prevent adjacent networks 115a and 115b from interfering with each other.

In particular embodiments, the unlicensed spectrum may comprise a 2.4 GHz band, and the first and second subset of frequency channels may each comprise 160 frequency channels. The first portion of the first and second subsets of frequency channels may comprise 80 frequency channels and the second portion of the first and second subsets of frequency channels may comprise 80 frequency channels. A transmit power of the data transmission may be as high as 36 dBm.

In particular embodiments, the unlicensed spectrum comprises a 915 MHz band, and the first and second subset of frequency channels each comprise 50 frequency channels. A transmit power of the data transmission may be as high as 36 dBm. The first portion of the first and second subsets of frequency channels may comprise 25 frequency channels and the second portion of the first and second subsets of frequency channels may comprise 25 frequency channels. A transmit power of the data transmission may be as high as 30 dBm.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

Although particular embodiments are described with respect to licensed or unlicensed spectrum, license assisted access, and/or carrier aggregation, the embodiments described herein apply equally to uplink and downlink scheduling in any spectrum and with respect to a single cell or any combination of cells.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9A below.

Figure 2:
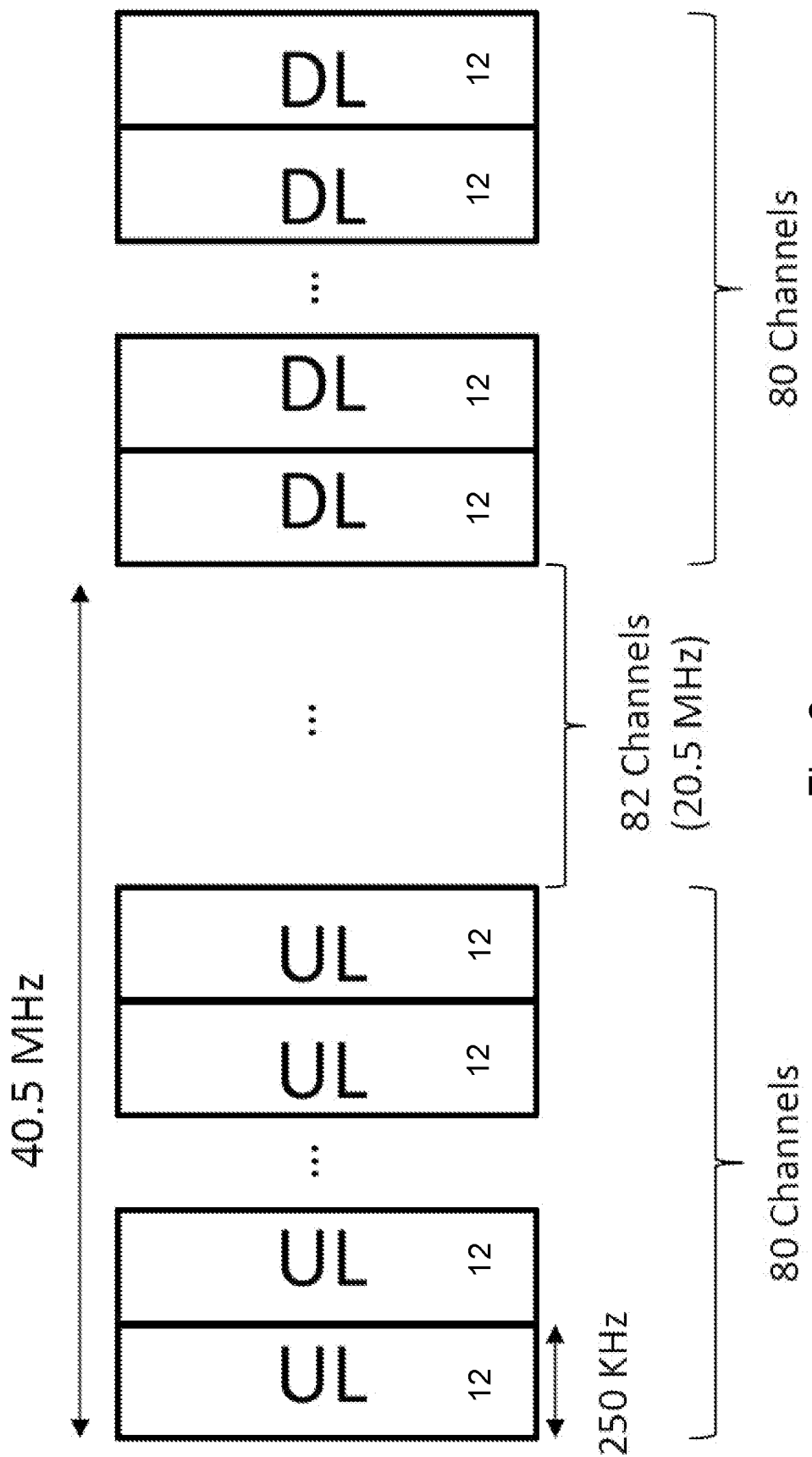
FIG. 2 illustrates a frequency channel configuration A or B for the 2.4 GHz frequency band, according to a particular embodiment.

Certain embodiments relate to channel partitioning in the 2.4 GHz band. The partitioning may be performed in relation to frequency channel configurations referred to as configurations A, B and C for the 2.4 GHz band in the description that follows. FIG. 2 shows an example of configuration A or B, and FIG. 3 shows an example of configuration C.

FIG. 2 illustrates a frequency channel configuration A or B for the 2.4 GHz frequency band, according to a particular embodiment. Configuration A comprises a first set of 160 total channels 12, out of which 80 frequency hopping channels are allocated to downlink transmissions and 80 frequency hopping channels are allocated to uplink transmissions. The subsets of downlink and uplink channels 12 are mutually exclusive. The duplex separation between a pair of downlink and uplink channels 12 within this set is set to 40.5 MHz. Additional channels 12 not used for downlink/uplink transmissions may be reserved as guard bands. Because the number of hopping channels 12 is greater than 75, according to the United States FCC 2.4 GHz regulations (see Table 1), the transmitter is permitted to transmit at Equivalent isotropically radiated power (EIRP) as high as 36 dBm.

Configuration B is similar to configuration A, except that the duplex separation between a pair of downlink and uplink channels 12 is set to a minimum of 40.5 MHz. In other words, the duplex separation for configuration B may be larger than 40.5 MHz depending on implementation. Furthermore, the set of channels 12 in configuration B does not overlap with the set of channels 12 in configuration A. Additional channels 12 not used for downlink/uplink transmissions may be reserved as guard bands. Because the number of hopping channels 12 is greater than 75, according to the United States FCC 2.4 GHz regulations (see Table 1), the transmitter is permitted to transmit at EIRP as high as 36 dBm.

Figure 3:
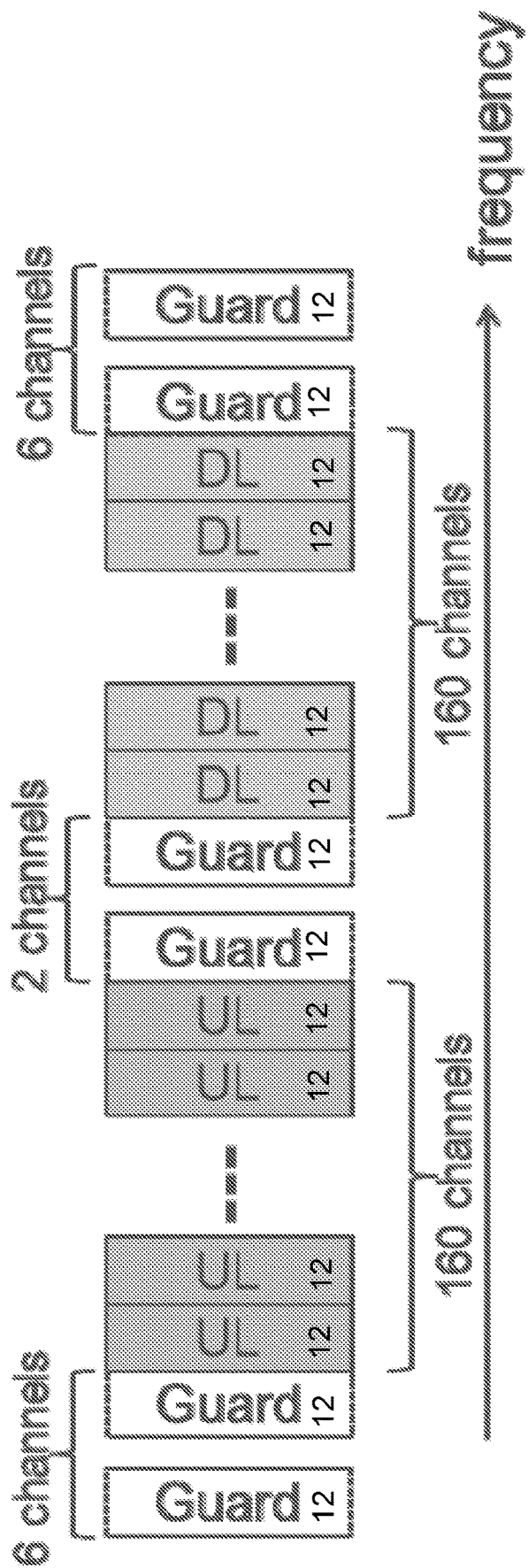
FIG. 3 illustrates a frequency channel configuration C for the 2.4 GHz frequency band, according to a particular embodiment.

FIG. 3 illustrates a frequency channel configuration C for the 2.4 GHz frequency band, according to a particular embodiment. Configuration C comprises a superset of 320 frequency channels 12, out of which 160 frequency channels 12 are allocated to downlink transmissions and 160 frequency channels 12 are allocated to uplink transmissions. In configuration C, a total of 14 channels 12 are used as guard bands, in addition to the 320 channels 12 used for downlink and uplink frequency-hopping data transmissions. The subsets of downlink and uplink channels 12 are mutually exclusive, and the minimum duplex separation between downlink and uplink channels 12 within this set is set to 40.5 MHz.

Configuration C is a superset of the channels in configurations A and B. Because the number of the hopping channels is greater than 75, according to the United States FCC 2.4 GHz regulations (see Table 1), the transmitter is permitted to transmit at EIRP as high as 36 dBm.

Figure 4:
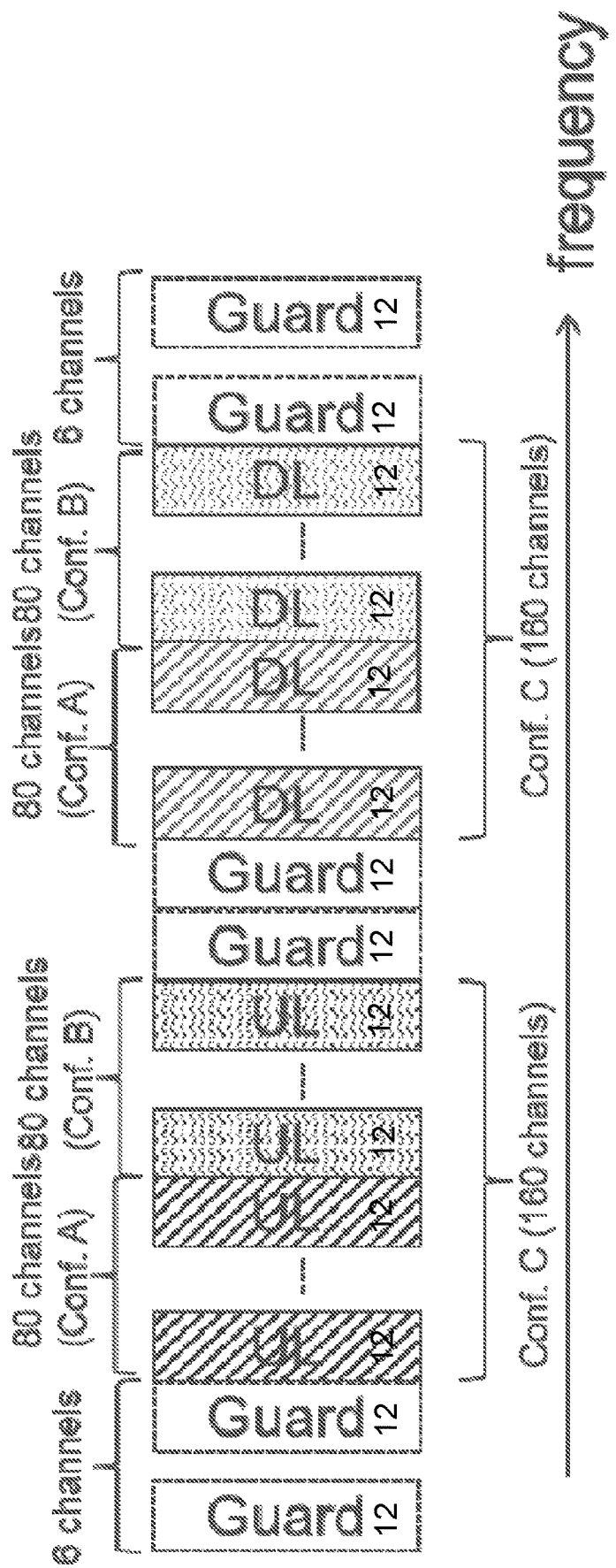
FIG. 4 illustrates frequency channel configurations A, B and C for the 2.4 GHz frequency band, according to a particular embodiment.

FIG. 4 illustrates frequency channel configurations A, B and C for the 2.4 GHz frequency band, according to a particular embodiment. Configuration A can be derived from configuration C by extracting the leftmost 80 uplink channels 12 and the leftmost 80 downlink channels 12. Configuration B can be derived from configuration C by extracting the rightmost 80 uplink channels 12 and the rightmost 80 downlink channels 12. Therefore, two adjacent frequency-hopping 2.4 GHz NB-IoT networks can be allocated configuration A and B, respectively, to avoid interference from overlapping frequency hopping channels.

Figure 5:
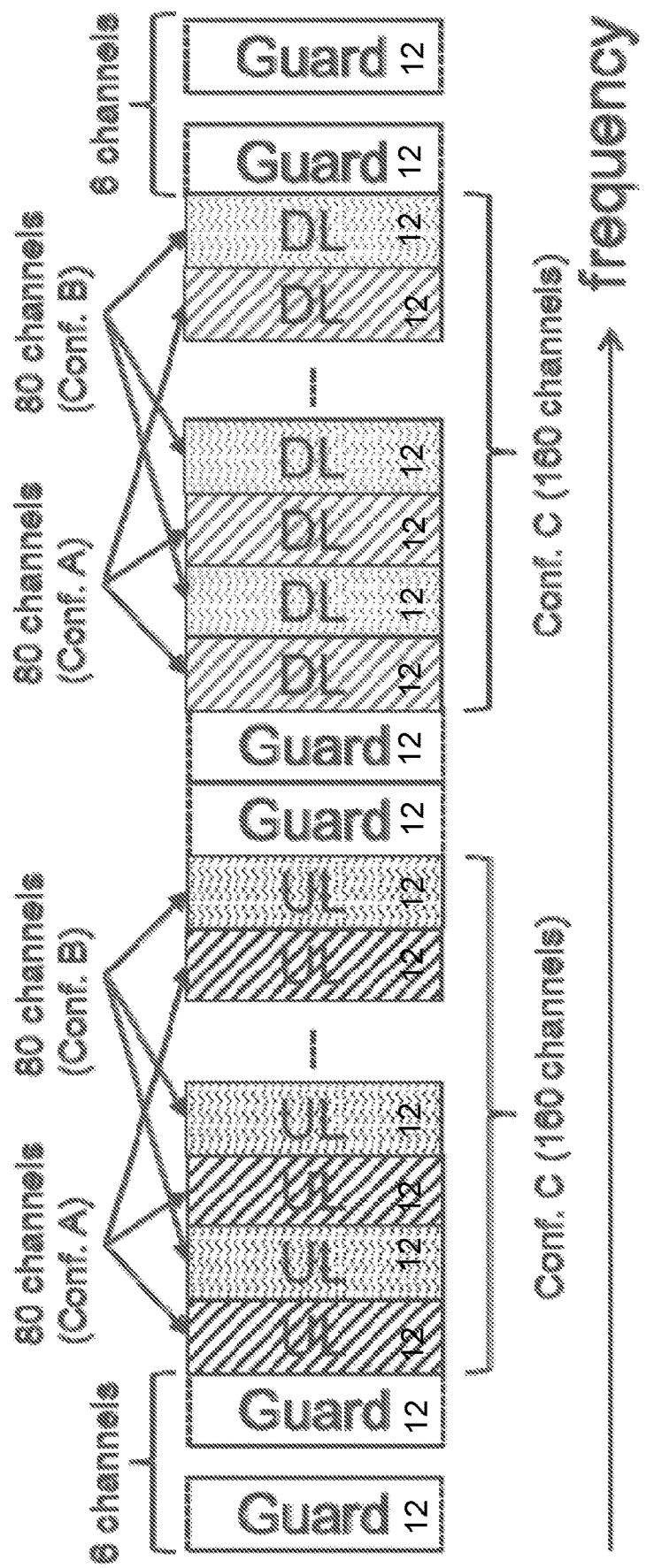
FIG. 5 illustrates frequency channel configurations A and B for the 2.4 GHz frequency band, according to a particular embodiment.

FIG. 5 illustrates frequency channel configurations A and B for the 2.4 GHz frequency band, according to a particular embodiment. This embodiment may be used as an alternative to the embodiment illustrated in FIG. 4, for example.

Configuration A may be derived from configuration C by extracting the even number indexed 80 uplink channels 12 and the even number indexed 80 downlink channels 12. Configuration B may be derived from configuration C by extracting the odd number indexed 80 uplink channels 12 and the odd number indexed 80 downlink channels 12. Therefore, two adjacent frequency-hopping 2.4 GHz NB-IoT networks can be allocated Configuration A and B, respectively, to avoid interference from overlapping frequency hopping channels.

In some embodiments, the configuration chosen by a NB-IoT network may be indicated to UEs via system information block (SIB) or master information block (MIB), or may be hard-coded in the UE subscriber identity module (SIM). The chosen configuration may also be broadcast to adjacent eNBs using over-the-air signaling, such as in a new control channel.

Particular embodiments include NB-IoT frequency channel partitioning in the 915 MHz band. The partitioning may be performed in relation to frequency channel configurations referred to as configurations A, B and C for the 915 MHz band in the description that follows.

Configuration A includes a first set of 50 total channels, out of which 25 frequency hopping channels are allocated to downlink transmissions and 25 frequency hopping channels are allocated to uplink transmissions. The subsets of downlink and uplink channels are mutually exclusive. The duplex separation between a pair of downlink and uplink channels within the set may be 13 MHz. Additional channels not used for downlink/uplink transmissions may be reserved as guard bands.

Configuration B includes a second set of 50 total channels, out of which 25 frequency hopping channels are allocated to downlink transmissions and 25 frequency hopping channels are allocated to uplink transmissions. The subsets of downlink and uplink channels are mutually exclusive. The minimum duplex separation between a pair of downlink and uplink channels within the set may be 13 MHz. Furthermore, the set of channels in Configuration B does not overlap with the set of channels in configuration A. Additional channels not used for downlink/uplink transmissions may be reserved as guard bands.

Configuration C includes a superset of 100 frequency channels, out of which 50 frequency channels are allocated to downlink transmissions and 50 frequency channels are allocated to uplink transmissions. The subsets of downlink and uplink channels are mutually exclusive. The minimum duplex separation between downlink and uplink channels within the set may be 13 MHz. Configuration C is a superset of the channels in configurations A and B.

Figure 6:
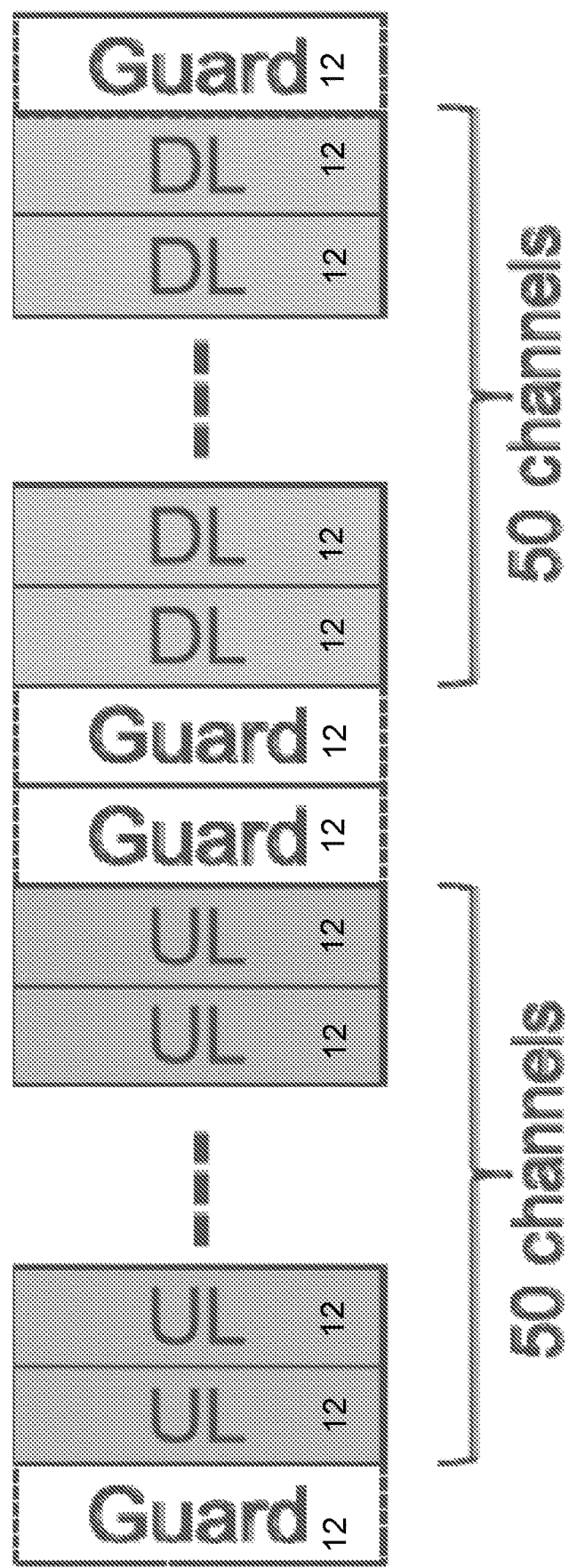
FIG. 6 illustrates a frequency channel configuration C for the 915 MHz frequency band, according to a particular embodiment.

FIG. 6 illustrates a frequency channel configuration C for the 915 MHz frequency band, according to a particular embodiment. Configuration C uses a total of 4 channels 12 as guard bands, in addition to the 50 channels 12 used for downlink and uplink frequency-hopping data transmissions each.

Configuration A may be derived from configuration C by extracting the leftmost 25 uplink channels 12 and the leftmost 25 downlink channels 12. Configuration B may be derived from configuration C by extracting the rightmost 25 uplink channels 12 and the rightmost 25 downlink channels 12. Therefore, two adjacent frequency-hopping 915 MHz NB-IoT networks can be allocated Configuration A and B, respectively, to avoid interference from overlapping frequency hopping channels. The use of configuration A or B, however, comes at the cost of a reduced EIRP of 30 dBm compared to 36 dBm allowed for Configuration C, as seen from Table 2.

In some embodiments, configuration A may be derived from configuration C by extracting the even number indexed 25 uplink channels 12 and the even number indexed 25 downlink channels 12. Configuration B may be derived from configuration C by extracting the odd number indexed 25 uplink channels 12 and the odd number indexed 25 downlink channels 12. Therefore, two adjacent frequency-hopping 915 MHz NB-IoT networks can be allocated Configuration A and B, respectively, to avoid interference from overlapping frequency hopping channels.

The configuration chosen by a NB-IoT network may be indicated to UEs via signaling (e.g., SIB or MIB), accessing a memory, preconfiguration (e.g., hard-coded in a UE SIM), or any other suitable manner. The chosen configuration may also be broadcast to adjacent eNBs using over-the-air signaling, such as in a new control channel.

In various alternative embodiments, a wireless communication device or radio access node such as those described above may perform or be configured to perform various methods and/or operations in relation to the frequency channel configurations described herein. Such methods and/or operations may include, for instance, steps for determining, generating or identifying such a configuration. Such steps could involve, for instance, accessing configuration information from memory, receiving configuration information via signaling, or being preconfigured with configuration information. Such methods and/or operations may further include, for instance, steps for processing information to be transmitted (or that has been received) according to one or more of the frequency channel configurations, as well as steps for actual communication (e.g., transmission or reception) according to the frequency channel configurations. Such steps may include, for instance, performing frequency hopping within such a frequency channel configuration, or performing transmissions with a power configuration as permitted by such a frequency channel configuration (e.g., transmitting with an EIRP as high as 36 dBm).

As indicated by the foregoing, certain embodiments of the disclosed subject matter provide ways to partition the available spectrum in the United States 2.4 GHz and 915 MHz unlicensed bands to construct a frequency-hopping-based NB-IoT network. For the United States 2.4 GHz band, the number of 250 kHz-wide frequency channels that are used for downlink or uplink transmissions is either 160 or 80 each. For the 915 MHz band, the number of 250 kHz-wide frequency channels that are used for downlink or uplink transmissions are either 50 or 25 each. Adjacent cells can be configured to use non-overlapping sets of 80 frequency channels for their operation.

Figure 7:
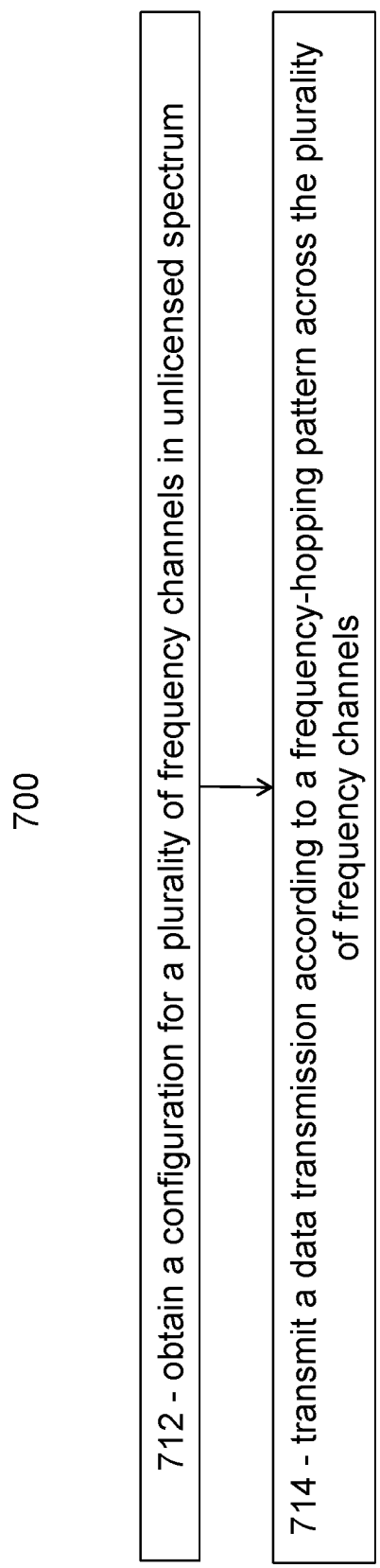
FIG. 7 is a flow diagram illustrating an example method in a wireless transmitter, according to some embodiments.

The configurations described above may be generally described with respect to FIG. 7 (transmitter) and FIG. 8 (receiver). The following examples may refer to a network node as a wireless transmitter and a wireless device as a wireless receiver, for convenience. The examples, however, may be reversed were the wireless device is the wireless transmitter and the network node is the wireless receiver.

FIG. 7 is a flow diagram illustrating an example method in a wireless transmitter, according to some embodiments. The method uses frequency-hopping transmissions in unlicensed spectrum. In particular embodiments, one or more steps of FIG. 7 may be performed by components of wireless network 100 described with respect to FIG. 1.

The method begins at step 712, where a wireless transmitter obtains a configuration for a plurality of frequency channels in unlicensed spectrum. The configuration for the plurality of frequency channels comprises a first subset of frequency channels for downlink transmission and a second subset of frequency channels for uplink transmission. The frequency channels in the first and second subsets are mutually exclusive.

For example, network node 120 may obtain any one of configurations A, B, or C described above with respect to FIGS. 2-6. Network node 120 may be preconfigured with the configuration, or may receive the configuration from another component of network 100 via signaling or any other suitable provisioning mechanism.

At step 714, the wireless transmitter transmits a data transmission according to a frequency-hopping pattern across the plurality of frequency channels. For example, network node 120 may hop between channels of any of configurations A, B, or C described above with respect to FIGS. 2-6. By using frequency hopping, network node 120 need not perform an LBT procedure before transmitting. Moreover, network node 120 may transmit at EIRP as high as 30 or 36 dBm (depending on the particular configuration).

Modifications, additions, or omissions may be made to method 700. Additionally, one or more steps in method 700 of FIG. 7 may be performed in parallel or in any suitable order. The steps of method 700 may be repeated over time as necessary.

FIG. 8 is a flow diagram illustrating an example method in a wireless receiver, according to some embodiments. The method uses frequency-hopping receptions in unlicensed spectrum. In particular embodiments, one or more steps of FIG. 8 may be performed by components of wireless network 100 described with respect to FIG. 1.

The method begins at step 812, where a wireless receiver obtains a configuration for a plurality of frequency channels in unlicensed spectrum. The configuration for the plurality of frequency channels comprises a first subset of frequency channels for downlink transmission and a second subset of frequency channels for uplink transmission. The frequency channels in the first and second subsets are mutually exclusive.

For example, wireless device 110 may obtain any one of configurations A, B, or C described above with respect to FIGS. 2-6. Wireless device 110 may be preconfigured with the configuration, or may receive the configuration from another component of network 100, such as network node 120, via signaling or any other suitable provisioning mechanism.

At step 814, the wireless receiver receives a data transmission according to a frequency-hopping pattern across the plurality of frequency channels. For example, wireless device 110 may hop between channels of any of configurations A, B, or C described above with respect to FIGS. 2-6.

Modifications, additions, or omissions may be made to method 800. Additionally, one or more steps in method 800 of FIG. 8 may be performed in parallel or in any suitable order. The steps of method 800 may be repeated over time as necessary.

Figure 9B:
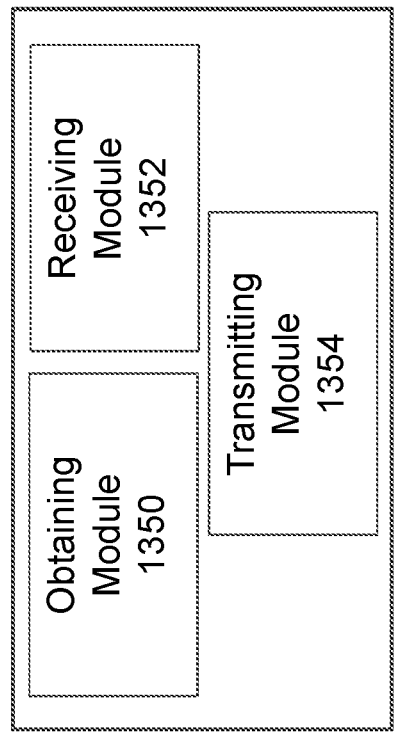
FIG. 9B is a block diagram illustrating example components of a wireless device.
Figure 9A:
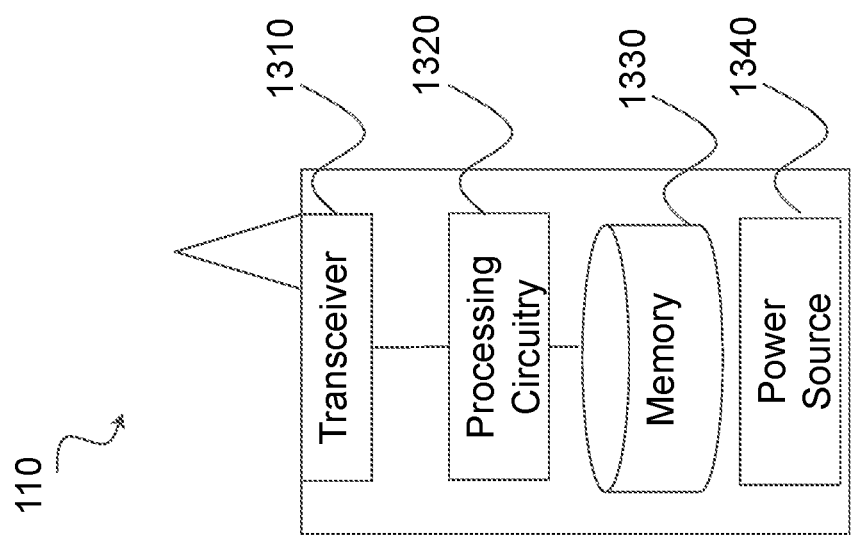
FIG. 9A is a block diagram illustrating an example embodiment of a wireless device.

FIG. 9A is a block diagram illustrating an example embodiment of a wireless device. The wireless device is an example of the wireless devices 110 illustrated in FIG. 1. In particular embodiments, the wireless device is capable of obtaining a configuration for a plurality of frequency channels in unlicensed spectrum, and transmitting or receiving a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1320 in communication with transceiver 1310 obtains a configuration for a plurality of frequency channels in unlicensed spectrum, and transmits or receives a data transmission according to a frequency-hopping pattern across the plurality of frequency channels.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. The components may include obtaining module 1350, receiving module 1352, and transmitting module 1354.

Obtaining module 1350 may perform the obtaining functions of wireless device 110. For example, obtaining module 1350 may obtain a configuration for a plurality of frequency channels in unlicensed spectrum, as described in any of the examples above. In certain embodiments, obtaining module 1350 may include or be included in processing circuitry 1320. In particular embodiments, obtaining module 1350 may communicate with receiving module 1352 and transmitting module 1354.

Receiving module 1352 may perform the receiving functions of wireless device 110. For example, receiving module 1352 may receive data transmissions using frequency-hopping according to any of the examples described above. In certain embodiments, receiving module 1352 may include or be included in processing circuitry 1320. In particular embodiments, receiving module 1352 may communicate with obtaining module 1350 and transmitting module 1354.

Transmitting module 1354 may perform the transmitting functions of wireless device 110. For example, transmitting module 1354 may transmit uplink subframes to network node 120 using frequency-hopping according to any of the examples described above. In certain embodiments, transmitting module 1354 may include or be included in processing circuitry 1320. In particular embodiments, transmitting module 1354 may communicate with obtaining module 1350 and receiving module 1352.

Figure 10B:
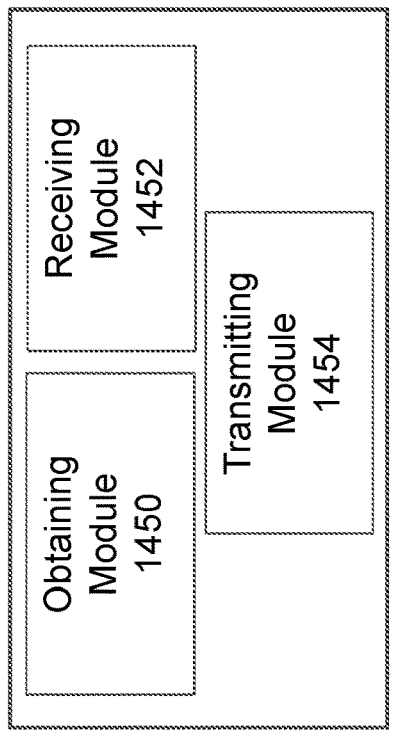
FIG. 10B is a block diagram illustrating example components of a network node.
Figure 10A:
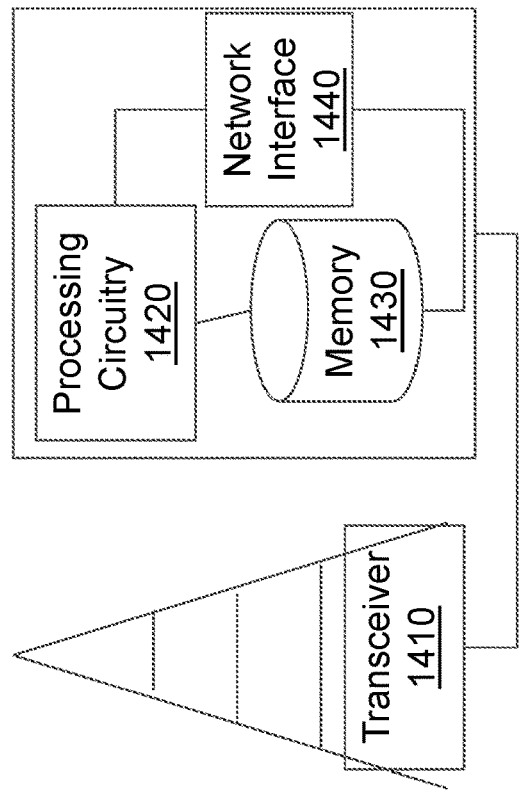
FIG. 10A is a block diagram illustrating an example embodiment of a network node.

FIG. 10A is a block diagram illustrating an example embodiment of a network node. The network node is an example of the network node 120 illustrated in FIG. 1. In particular embodiments, the network node is capable of obtaining a configuration for a plurality of frequency channels in unlicensed spectrum, and transmitting or receiving a data transmission according to a frequency-hopping pattern across the plurality of frequency channels. The configuration for the plurality of frequency channels comprises a first subset of frequency channels for downlink transmission and a second subset of frequency channels for uplink transmission. The frequency channels in the first and second subsets are mutually exclusive.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 9A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

Other embodiments of network node 120 include additional components (beyond those shown in FIG. 10A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 10B is a block diagram illustrating example components of a network node 120. The components may include obtaining module 1450, receiving module 1452, and transmitting module 1454.

Obtaining module 1450 may perform the obtaining functions of network node 120. For example, obtaining module 1450 may obtain a configuration for a plurality of frequency channels in unlicensed spectrum, as described in any of the examples above. In certain embodiments, obtaining module 1450 may include or be included in processing circuitry 1420. In particular embodiments, obtaining module 1450 may communicate with receiving module 1452 and transmitting module 1454.

Receiving module 1452 may perform the receiving functions of network node 120. For example, receiving module 1452 may receive data transmissions using frequency-hopping according to any of the examples described above. In certain embodiments, receiving module 1452 may include or be included in processing circuitry 1420. In particular embodiments, receiving module 1452 may communicate with obtaining module 1450 and transmitting module 1454.

Transmitting module 1454 may perform the transmitting functions of network node 120. For example, transmitting module 1454 may transmit downlink subframes to wireless device 110 using frequency-hopping according to any of the examples described above. In certain embodiments, transmitting module 1454 may include or be included in processing circuitry 1420. In particular embodiments, transmitting module 1454 may communicate with obtaining module 1450 and receiving module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
DL Downlink
EIRP Equivalent Isotropically Radiated Power
eNB Evolved NodeB
FDD Frequency Division Duplex
FH Frequency-Hopping
IoT Internet-of-Things
LAA License Assisted Access
LBT Listen-Before-Talk
LTE Long Term Evolution LTE-U LTE in Unlicensed Spectrum
MAC Medium Access Control
M2M Machine to Machine
MF MulteFire
MIB Master Information Block
MIMO Multi-Input Multi-Output
MTC Machine Type Communication
NB IoT NarrowBand IoT
NR New Radio
PDSCH Physical Downlink Shared Channel
PRB Physical Resource Block
PUCCH Physical Uplink Control Channel
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
RS Reference Signal
SCell Secondary Cell
SIB System Information Block
SIM Subscriber Identity Module
TDD Time Division Duplex
UE User Equipment
UL Uplink
UTRAN Universal Terrestrial Radio Access Network
WAN Wireless Access Network

The invention claimed is:

1. A method for use in a frequency-hopping wireless transmitter in a Narrowband-Internet of Things, NB-IoT, network for transmitting in unlicensed spectrum, the method comprising:
   obtaining an NB-IoT frequency channel configuration for a plurality of frequency channels in a single unlicensed frequency band, wherein each frequency channel has a bandwidth of 250 Khz; and
   transmitting a data transmission according to a frequency-hopping pattern across the plurality of frequency channels, wherein the data transmission is transmitted without performing a Listen-Before-Talk, LBT, procedure; and
   wherein:
      the NB-IoT frequency channel configuration for the plurality of frequency channels comprises a first portion of a first contiguous subset of frequency channels for downlink transmission and a first portion of a second contiguous subset of frequency channels for uplink transmission, and the frequency channels in the first and second contiguous subsets are mutually exclusive;
      the first portion of the first contiguous subset of frequency channels and the first portion of the second contiguous subset of frequency channels are allocated to a first network, and a second portion of the first contiguous subset of frequency channels and a second portion of the second contiguous subset of frequency channels are allocated to a second network; and
      a duplex separation between the subset of frequency channels for downlink transmission downlink and the subset of the frequency channels for uplink transmission is set to a minimum of 13 MHz or 40.5 MHz depending upon the NB-IoT frequency channel configuration in the single unlicensed frequency band.

2. A frequency-hopping wireless transmitter in a Narrowband-Internet of Things, NB-IoT, network operable to transmit in unlicensed spectrum, the wireless transmitter comprising processing circuitry operable to:
   obtain an NB-IoT frequency channel configuration for a plurality of frequency channels in a single unlicensed frequency band, wherein each frequency channel has a bandwidth of 250 Khz; and
   transmit a data transmission according to a frequency-hopping pattern across the plurality of frequency channels, wherein the data transmission is transmitted without performing a Listen-Before-Talk, LBT, procedure; and
   wherein:
      the NB-IoT frequency channel configuration for the plurality of frequency channels comprises a first portion of a first contiguous subset of frequency channels for downlink transmission and a first portion of a second contiguous subset of frequency channels for uplink transmission, and the frequency channels in the first and second contiguous subsets are mutually exclusive;
      the first portion of the first contiguous subset of frequency channels and the first portion of the second contiguous subset of frequency channels are allocated to a first network, and a second portion of the first contiguous subset of frequency channels and a second portion of the second contiguous subset of frequency channels are allocated to a second network; and
      a duplex separation between the subset of frequency channels for downlink transmission downlink and the subset of the frequency channels for uplink transmission is set to a minimum of 13 MHz or 40.5 MHz depending upon the NB-IoT frequency channel configuration in the single unlicensed frequency band.

3. The wireless transmitter of claim 2, wherein the unlicensed frequency band comprises a 2.4 GHz band and, wherein the first contiguous subset of frequency channels comprises 160 frequency channels and the second contiguous subset of frequency channels comprises 160 frequency channels.

4. The wireless transmitter of claim 2, wherein the unlicensed frequency band comprises a 2.4 GHz band and, wherein the first portion of the first and second contiguous subsets of frequency channels comprises 80 frequency channels and the second portion of the first and second contiguous subsets of frequency channels comprises 80 frequency channels.

5. The wireless transmitter of claim 2, wherein the unlicensed frequency band comprises a 915 MHz band and, wherein the first contiguous subset of frequency channels comprises 50 frequency channels and the second contiguous subset of frequency channels comprises 50 frequency channels.

6. The wireless transmitter of claim 2, wherein the unlicensed frequency band comprises a 915 MHz band and, wherein the first portion of the first and second contiguous subsets of frequency channels comprises 25 frequency channels and the second portion of the first and second contiguous subsets of frequency channels comprises 25 frequency channels.

7. A method for use in a frequency-hopping wireless receiver in a Narrowband-Internet of Things, NB-IoT, network for receiving in unlicensed spectrum, the method comprising:

obtaining an NB-IoT frequency channel configuration for a plurality of frequency channels in a single unlicensed frequency band, wherein each frequency channel has a bandwidth of 250 Khz; and receiving a data transmission according to a frequency-hopping pattern across the plurality of frequency channels, wherein the data transmission is transmitted without performing a Listen-Before-Talk, LBT, procedure; wherein:

the NB-IoT frequency channel configuration for the plurality of frequency channels comprises a first portion of a first contiguous subset of frequency channels for downlink transmission and a first portion of a second contiguous subset of frequency channels for uplink transmission, and the frequency channels in the first and second contiguous subsets are mutually exclusive;

the first portion of the first contiguous subset of frequency channels and the first portion of the second contiguous subset of frequency channels are allocated to a first network, and a second portion of the first contiguous subset of frequency channels and a second portion of the second contiguous subset of frequency channels are allocated to a second network; and a duplex separation between the subset of frequency channels for downlink transmission downlink and the subset of the frequency channels for uplink transmission is set to a minimum of 13 MHz or 40.5 MHz depending upon the NB-IoT frequency channel configuration in the single unlicensed frequency band.

8. The method of claim 7, wherein the unlicensed frequency band comprises a 2.4 GHz band and, wherein the first contiguous subset of frequency channels comprises 160 frequency channels and the second contiguous subset of frequency channels comprises 160 frequency channels.

9. The method of claim 7, wherein the unlicensed frequency band comprises a 2.4 GHz band and, wherein the first portion of the first and second contiguous subsets of frequency channels comprises 80 frequency channels and the second portion of the first and second contiguous subsets of frequency channels comprises 80 frequency channels.

10. The method of claim 7, wherein the unlicensed frequency band comprises a 2.4 GHz band and, wherein the first contiguous subset of frequency channels comprises 50 frequency channels and the second contiguous subset of frequency channels comprises 50 frequency channels.

11. The method of claim 7, wherein the unlicensed frequency band comprises a 2.4 GHz band and, wherein the first portion of the first and second contiguous subsets of frequency channels comprises 25 frequency channels and the second portion of the first and second contiguous subsets of frequency channels comprises 25 frequency channels.

12. A frequency-hopping wireless receiver in a Narrowband-Internet of Things, NB-IoT, network operable to receive in unlicensed spectrum, the wireless receiver comprising processing circuitry operable to:

obtain an NB-IoT frequency channel configuration for a plurality of frequency channels in a single unlicensed frequency band, wherein each frequency channel has a bandwidth of 250 Khz; and receive a data transmission according to a frequency-hopping pattern across the plurality of frequency channels, wherein the data transmission is transmitted without performing a Listen-Before-Talk, LBT, procedure; wherein:

the NB-IoT frequency channel configuration for the plurality of frequency channels comprises a first portion of a first contiguous subset of frequency channels for downlink transmission and a first portion of a second contiguous subset of frequency channels for uplink transmission, and the frequency channels in the first and second contiguous subsets are mutually exclusive;

the first portion of the first contiguous subset of frequency channels and the first portion of the second contiguous subset of frequency channels are allocated to a first network, and a second portion of the first contiguous subset of frequency channels and a second portion of the second contiguous subset of frequency channels are allocated to a second network; and a duplex separation between the subset of frequency channels for downlink transmission downlink and the subset of the frequency channels for uplink transmission is set to a minimum of 13 MHz or 40.5 MHz depending upon the NB-IoT frequency channel configuration in the single unlicensed frequency band.

13. The wireless receiver of claim 12, wherein a bandwidth of each frequency channel of the plurality of frequency channels comprises 250 kHz.

14. The wireless receiver of claim 12, wherein the unlicensed frequency band comprises a 2.4 GHz band.

15. The wireless receiver of claim 14, wherein the first contiguous subset of frequency channels comprises 160 frequency channels and the second contiguous subset of frequency channels comprises 160 frequency channels.

16. The wireless receiver of claim 14 wherein the first portion of the first and second contiguous subsets of frequency channels comprises 80 frequency channels and the second portion of the first and second contiguous subsets of frequency channels comprises 80 frequency channels.

17. The wireless receiver of claim 12, wherein the unlicensed frequency band comprises a 915 MHz band.

18. The wireless receiver of claim 17, wherein the first contiguous subset of frequency channels comprises 50 frequency channels and the second contiguous subset of frequency channels comprises 50 frequency channels.

19. The wireless receiver of claim 17, wherein the first portion of the first and second contiguous subsets of frequency channels comprises 25 frequency channels and the second portion of the first and second contiguous subsets of frequency channels comprises 25 frequency channels.

* * * * *